C. E. HIXSON.
SYSTEM OF DETERMINING THE AGE AND IDENTIFICATION OF AUTOMOBILE TIRES.
APPLICATION FILED SEPT. 19, 1921.
1,411,356.
Patented Apr. 4, 1922.
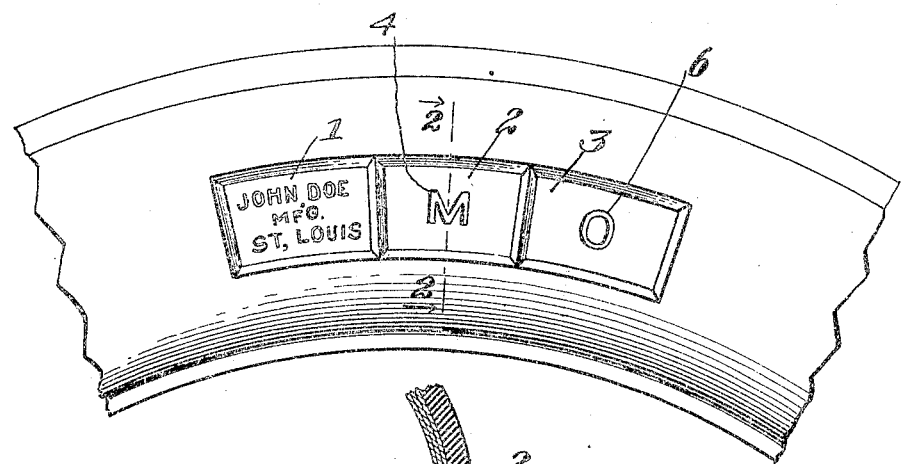
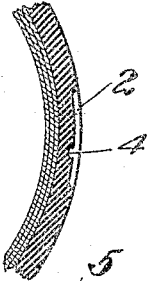
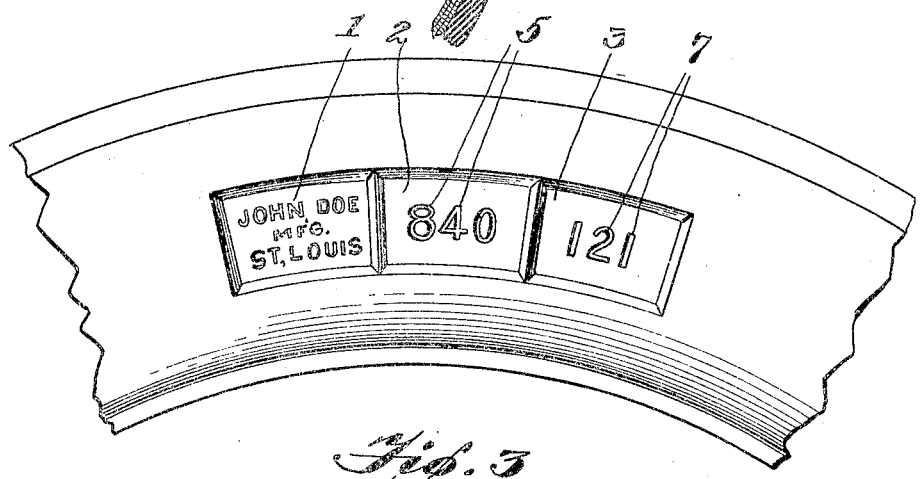
Inventor
C. E. Hixson.

UNITED STATES PATENT OFFICE.

CHARLES E. HIXSON, OF MACON, MISSOURI.

SYSTEM OF DETERMINING THE AGE AND IDENTIFICATION OF AUTOMOBILE TIRES.

1,411,356.    Specification of Letters Patent.    Patented Apr. 4, 1922.

Application filed September 19, 1921. Serial No. 501,710.

*To all whom it may concern:*

Be it known that I, CHARLES E. HIXSON, a citizen of the United States, residing at Macon, in the county of Macon and State of Missouri, have invented certain new and useful Improvements in Systems of Determining the Age and Identification of Automobile Tires, of which the following is a specification, reference being had therein to the accompanying drawings.

This invention relates to a system of determining the age and identification of automobile tires, and the object of the invention is the provision of means whereby the manufacturer can readily identify a tire, and the purchaser will know the tire is not old, nor has not been in stock a long time.

Another object of the invention is the provision of means whereby a person ordering a tire from a manufacturer can place his own identification mark on the same, to determine its age, and at the same time the manufacturer can also have on the tire his identification mark or "key."

With these and other objects in view, my invention comprises certain novel combinations, constructions and arrangements of parts as will be hereinafter described, illustrated in the accompanying drawings, and more particularly pointed out in the appended claim.

In the drawing:

Figure 1 is a fragmentary view, in elevation, of a portion of a tire showing my system of identification marks thereon.

Figure 2 is a sectional view, taken on line 2—2, Fig. 1, and looking in the direction of the arrows.

Figure 3 is a view, similar to Fig. 1, of another embodiment of the present invention.

Often when a party purchases an automobile tire, he secures a tire that has been manufactured for a long time and as age tends to deteriorate or destroy the life of rubber, it is desirous to enable the purchaser to buy a tire from a manufacturer, or dealer, that is not old, but which has been recently constructed or made. Therefore, in carrying out my invention I form during the manufacture of the tire, preferably three spaces or compartments 1, 2 and 3 in the body of the tire. In space 1 I place the name preferably of the dealer, as an advertising feature, while in space 2 a letter "4" (Fig. 1) or numerals 5 (Fig. 3) is placed or formed by the manufacturer as a means of identification, since this letter, or numerals, will be his "key" to identify the date the tire was completed; he will have the "key" in his office; that is, a reference giving the date of manufacture but to the public it will remain a secret, as the public will not know what letter 4, or numerals 5 designate.

When the purchaser or user of the tire orders the manufacturer or dealer to furnish same, the purchaser gives a letter, such as 6, (0) as the "key," or he may give the numeral 7 (121) as the "key," but, the purchaser, knows the date that he furnished "key" 6 or "key" 7 to the manufacturer, so that the manufacturer has to place this "key" in space 3, and when the purchaser receives his tire, he will know that it is of recent manufacture or construction. There is no way to deceive the purchaser, for any of the twenty-six letters of the alphabet may be used, or any numeral that the purchaser might suggest will have to be placed in the space 3, so that it will be impossible for the manufacturer to keep, in stock, tires of all possible numerical designations, and, as a consequence, each order has to be filled as it is received by the manufacturer, and the necessary "key" of the particular purchaser placed in space 3.

My system of identification may be involved in a broad sense, in the designation of other classes of goods to be secured from a manufacturer.

What I claim is:

In a system of the class described, the combination of a tire provided in its side with a series of aligned compartments, one of said compartments provided with a name of a manufacturer or maker, another of said compartments provided with a "key" letter or numeral for the manufacturer's information, and the other compartment provided with a "key" letter or numeral for the purchaser's information or protection.

In testimony whereof I hereunto affix my signature.

CHARLES E. HIXSON.